United States Patent [19]
Hess

[11] Patent Number: 4,893,847
[45] Date of Patent: Jan. 16, 1990

[54] BEARING SEAL FOR UNIVERSAL BALL JOINT

[75] Inventor: Robert A. Hess, Altadena, Calif.

[73] Assignee: Stainless Steel Products, Inc., Burbank, Calif.

[21] Appl. No.: 214,944

[22] Filed: Jul. 5, 1988

[51] Int. Cl.$^4$ .............................................. F16L 27/04
[52] U.S. Cl. ................................... 285/226; 285/263; 285/286; 285/910
[58] Field of Search ............... 285/226, 910, 270, 268, 285/286, 263, 267, 277; 277/230, DIG. 6

[56] References Cited

U.S. PATENT DOCUMENTS

| | | | |
|---|---|---|---|
| 1,974,780 | 9/1934 | Mann | 285/270 X |
| 2,840,394 | 6/1958 | Rohr | 285/268 X |
| 4,427,220 | 1/1984 | Decker | 285/267 X |
| 4,462,603 | 7/1984 | Usher et al. | 285/910 X |
| 4,516,782 | 5/1985 | Usher | 285/910 X |
| 4,747,624 | 5/1988 | Faber | 285/917 X |

FOREIGN PATENT DOCUMENTS

| | | | |
|---|---|---|---|
| 3618485 | 1/1987 | Fed. Rep. of Germany | 285/268 |
| 1126871 | 9/1968 | United Kingdom | 285/226 |

*Primary Examiner*—Dave W. Arola
*Attorney, Agent, or Firm*—Harlan P. Huebner

[57] ABSTRACT

An aircraft engine bleed air ducting system including at least one universal ball joint within said ducting, said joint fitted with an annular bearing seal to seal and reduce the coefficient of friction between moving parts in said joint during angulation of said joint. The annular bearing seal includes a reinforcement wire surrounded by a graphite composition, which composition is in direct contact with parts of said bearing seal and said wire aids in prevention of deformation of said bearing seal.

5 Claims, 1 Drawing Sheet

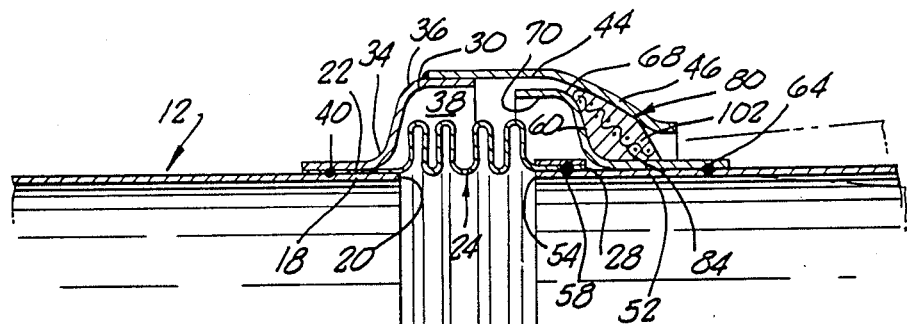
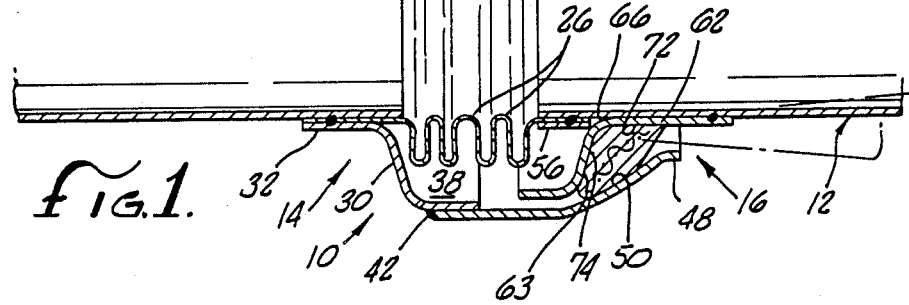
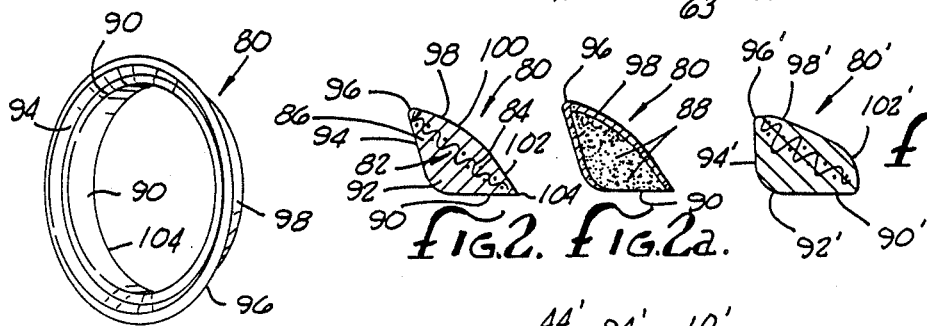
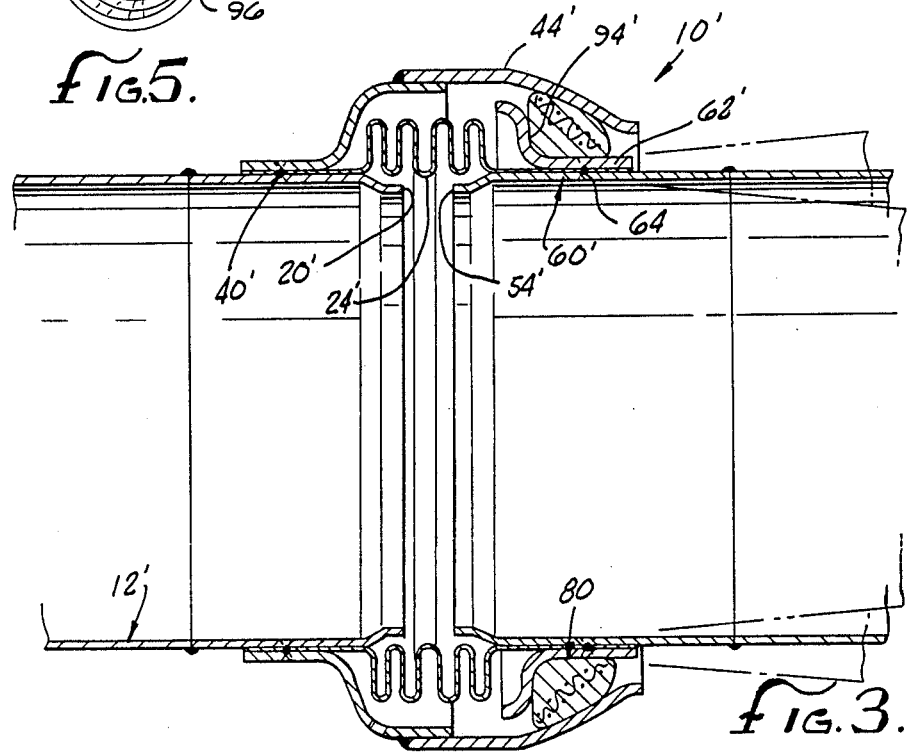

BEARING SEAL FOR UNIVERSAL BALL JOINT

BACKGROUND OF THE INVENTION

1. Field of the Invention

This invention relates to a bearing seal for a universal ball joint primarily for use in aircraft pneumatic bleed air ducting.

2. Description of the Prior Art

In the prior art there have been universal ball joints that are interposed in pneumatic bleed air ducting such as aircraft pneumatic bleed air ducting. However, due to the contraction and expansion of the ducting and the construction of the joints, the coefficient of friction between the parts that allow angulation of the universal ball joint is extremely high resulting in a high joint bending moment.

When an aircraft jet engine is activated the bleed air passing through the engine port into the pneumatic bleed air ducting can reach temperatures up to 1250° F. This of course causes thermal deflection of the ducting and thus one need for universal ball joints to be able to angulate and accommodate the deflection.

The universal ball joint with its angulation capabilities will also be able to be bent to compensate for installation tolerances during installation, aircraft structural deflections and vibration deflections.

When one ball joint is connected to another ball joint with or without a straight tube between the two ball joints and when this subassembly is connected to an elbow with a bend angle greater than 30° and less than 150° and when the elbow is connected to a third ball joint this forms a "three-bar-linkage." When ducting is connected to three ball joints such that two ball joints have their center line axes in line or approximately in line and this subassembly is attached to a third ball joint at an angle of at leat 30° but no more than 150° this also forms a "three-bar-linkage." A three-bar-linkage has the ability to have one end held fixed and provide X,Y,Z,$\theta$x,$\theta$y,$\theta$z (motion at the other end while the three flexible joints only angulate.

One form of a prior art universal ball joint was a two piece joint where there was metal to metal contact so that as the joint was bent there was metal galling and an extremely high coefficient of friction.

Another form of a prior art attempt to conquer the coefficient of friction was to coat the contacting metal to metal parts the universal ball joint with various types of lubricants. While it is estimated that the initial coefficient of friction might be between 0.07 to 0.10, the more that type of universal ball joint was angulated the lubricant film would break down resulting again in metal to metal contact and a great increase in the coefficient of friction on the magnitude of 0.30 to 0.35 and greater.

Another form of prior art universal ball joint used ball bearings between the moving parts. However, such construction increased both the cost and weight of the joint because of the need for some form of retainer means for the ball bearings and the multiple bearings themselves.

SUMMARY OF THE INVENTION

It is a purpose of the present invention to provide a universal ball joint that has bending moments with a coefficient of friction starting with 0.07 and during angulation can remain the same or decrease to 0.04 or increase to 0.10 depending on test conditions.

Another object of the present invention is to utilize a special type of bearing seal between the parts of the universal ball joint that bend to reduce the coefficient of friction so there is no metal to metal contact.

A further object of the present invention is to provide a bearing sealing ring that includes a core of knitted or mesh wire that is surrounded by a compound of graphite. One form of such composition of graphite is called "GRAFOIL" which is a registered trademark of Union Carbide Corporation which manufactures the compound.

A still further object of the present invention is to form a bearing seal ring with a cross-sectional shape to conform to elements of a universal ball joint so that no matter what expansion of the duct may occur within the ducting or what temperature, the bellows and bearing seal will seal the joint against leakage but also against decomposition.

Another object is to provide a universal ball joint adapted to angulate 6° or more in all directions from a center line passing through the joint and a bearing seal that will prevent leakage from the joint no matter the angulation.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which:

FIG. 1 is a cross-sectional side elevational view of a universal ball joint, ducting and the seal of the present invention;

FIG. 2 and 2a are cross-sectional view of the seal of the present invention illustrating several positions the wire mesh may assume within the seal material;

FIG. 3 is a view similar to FIG. 1 but a slight modification of the universal ball joint and cross-sectional configuration of the seal;

FIG. 4 is a cross-sectional configuration of the seal in FIG. 3; and

FIG. 5 is a perspective view of the ring seal of the present invention.

DETAILED DESCRIPTION OF THE PREFERRED EMBODIMENT

In FIG. 1 there is illustrated a universal joint generally designated 10 which is interposed in a duct generally designated 12. The duct 12 is usually a bleed air duct such as used in aircraft and may be of stainless steel or other appropriate material. The bleed air may be used for a number of jobs in the aircraft.

The universal joint designated 10 is particularly suited for use in bleed air duct such as a jet aircraft bleed air system where there is an expansion of the ducting as the bleed air heats it up. The present joint 10 due to construction and sealing will angulate to allow duct expansion and contraction. With both structural hinderances and thermal cycling the necessity and desirability of relief in the ducting to move angularly to prevent cracking or breaking of the ducting becomes apparent. Thus, with a single universal joint 10 or more within the ducting 12 the ability of the joint to flex and angulate in the neighborhood of 6° in all directions relative to a center line passing longitudinally through the joint 10, such as shown in phantom lines in FIGS. 1 and 3, stress and deflection in the duct may be relieved.

The universal joint 10, which is conventional, includes two tubular halves generally designated 14 and 16, with a portion of half 16 within a portion of half 14. The ducting 12, on the left in FIG. 1, includes an annular end section 18 terminating in end 20.

Fitted around the annular end section 18 is an annular bellows sleeve 22 which is connected to a conventional bellows 24 having a number of convolutions 26. The opposite side of the bellows 24 includes an annular end section 28.

Mounted on the annular bellows sleeve 22 is a transition element 30 having a sleeve portion 32 which is bent outwardly at 34 and then bent at 36 forming a radially enlarged flange 30 with an annular bellows cavity 38.

The end element 18 of duct 12, annular bellows sleeve 22 and the sleeve portion 32 of the transition element 30 are fusion welded at 40 to hold them together and to prevent leakage therebetween. While fusion welding is preferred any other type of fastening that will withstand the necessary pressures and breaking may be used without departing from the spirit of the invention.

Projecting outward of the flange 30 and secured thereto at weld 42 is an annular outer race 44 having an annular inwardly tapered bearing seal contact section 46 which terminates in a flared end portion 48. The tapered bearing seal contact section 46 includes an inner annular face 50.

The duct 12, on the right side in FIG. 1, also includes an annular end section 52, similar to end section 18 and terminates in end 54.

The bellows end section 28 is fitted around the end section 52 of the ducting, and fitted around the bellows end section 28 may be a weld band 56. In order to maintain the bellows end section 28, end section 52 and weld band 56 the pieces are annularly fusion welded at 58 or welded by other types of welding.

Again referring to the universal ball joint 10, and the other half 16, on the right side in FIG. 1, there is provided an inner retainer 60 having a sleeve 62 that fits around the end section 52 of duct 12 and is secured thereto by fusion or other weld at 64. The end section 52 is bent outwardly at 66 and then at 68 there is a bend and the end flange 70 terminates spaced from and slightly inwardly of transition element 30.

The inner retainer 60 on the sleeve 62 and outward transition section 63 include outer bearing seal engaging surfaces 72 and 74 respectfully.

Interposed between contact section 46 of annular outer race 44 and inner retainer 60 is a bearing seal means generally designated 80. The bearing seal means 80 is annular as best seen in FIG. 5.

The structure of said bearing seal means 80 includes a wire reinforcement means generally designated 82. Preferably the wire reinforcement means 82 is a wire mesh core 84 that forms a ring. The means 82 also includes a graphite substance 86 such as a composition made by Union Carbide under the trademark "GRAFOIL", that surrounds the wire means core 82. During the manufacture of the bearing seal means 80 the wire mesh core 84 may remain as shown in FIG. 2, or be broken up into the many strands 88, see FIG. 2a and distributed throughout the internal section of the bearing seal 80.

In the manufacture of the bearing seal 80 the pressure exerted by the graphite substance 86 during the forming of the ring may cause the wire mesh to flair in all direction within the confinement of the exterior portion of the bearing seal means.

The annular bearing seal 80 such as illustrated in FIGS. 1, 2, and 2a has a cross sectional shape that is adapted to interfit between and engage the respective surfaces 50 and 74. There is a bottom generally horizontal interior face or edge 90 which has a radius 92 at one end that moves into an inner retainer bearing face or edge 94 that angles relative to the plane of edge 90. There is an acute radius 96 at an opposite end of the face or edge 94 that extends around to a face or edge 98 which preferably includes an upper outer race engaging face or surface 100 and a lower unengaged surface or face 102 slightly canted from the plane of the surface 100. The edge 98 terminates at a point 104 with an end of the interior face or edge 90.

In assembly, the annular bearing seal 80 may be slipped around the sleeve 62 of joint 10 with interior face or edge 90 annularly contacting the sleeve 62 along the length of said face 90. The seal 80 is moved forward until the radius 92 engages the radius of the inner retainer 60 and is seated with edge 94 against the outer race engaging surface 74. Next the transition element 30 and outer race 44 may be positioned on the half 18 of the joint 10 where the race 44 encompasses the bearing seal 80 and is secured at 40. The face 50 of the tapered bearing seal contact section 46 will be in direct contact with the upper outer race engaging surface 100, see FIG. 1.

With the construction and assembly as just described it can be seen that a seal develops to prevent leakage of the jet bleed air discharge therefrom during use of the duct. The sealing feature is increased when the heated bleed air is in a duct 12 and passes through the joint 10 because there is a tendency for the joint to become longer when internally pressurized thus assuring several good areas of annular contact. Therefore, if a bellows failure occurs the bearing will act as a seal to limit and diffuse the joint leakage.

When the joint 10 is to be bent or angled as desired for reasons as previously described the surfaces or edges 90, 94 and 98 will serve to allow a smooth rotation of the retainer 60 or race 44 upon the graphite composition without galling or binding. In the case of angulation which occurs during the passage of jet bleed air which may require many angular corrections the coefficient of friction is relatively low on the order of 0.07 to 0.04.

In FIG. 3 there is illustrated a universal ball joint 10' which is identical with joint 10 except with regard to the cross shape of the inner retainer 60'. In addition, depending on the internal diameter of the duct 12' the ends 20' and 54' may be bent inwardly to form a liner to protect the bellows from direct impingement of air on the bellows possibly causing the bellows to resonate and fail.

The bearing seal 80' has the interior edge 90', see FIG. 4, and the radius 92', however the inner retainer bearing edge or surface 94' is normal to the edge or surface 90'. In addition, the edge 94' of the retainer 60' is bent normal to the sleeve 62'.

The edge 98' of bearing seal 80' in cross section proceeds at less of a downward angle from the radius 96' than the edge or face 98. The lower surface or face or edge 102' is arcuate. This particular construction is utilized to accommodate the space between the retainer 60' and race 44'.

In assembly and operation the bearing seal 80' works in the same way as the bearing seal 80.

In operation, the bending of the universal ball joint 10 and cooperation with the compression of the bellows 24 is such that the outer race 44 when sliding on the bearing seal 80 will not distort the seal 80. The bellows 24 will actually be the instrument to compress or expand with a bending of the duct 12 and joint 10 so that there is assured a complete annular even contact of the race 44 against the seal 80. In the construction as described and illustrated the bearing seal 80 and race 44 carry the full load.

While the description has only referred to a single universal ball joint 10 it must be appreciated that along the length of a duct 12 which carries the hot bleed air from a jet engine there may be several joints 10. The joints 10 in plurality will each angulate to accommodate deflections such as structural deflection of parts of the aircraft, thermal deflections of the ducts 12 and/or installation tolerances of the ducts 12.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. In a universal ball joint, for an annular bleed high temperature air ducting which includes at least two pieces each having a plane with said universal ball joint interposed between said pieces of ducting, said universal ball joint capable of angulation to change the direction of said pieces of ducting, said universal ball joint having an annular first half secured to one of said pieces of said ducting, and an annular second half secured to the other of said pieces of said ducting an annular bellows within said ball joint between and uniting each of said pieces of ducting one with the other, said first half of said ball joint having a race portion overlying said bellows and a portion of said second half, said second half of said ball joint having a retainer portion underlying said race creating a bearing seal space therebetween, and said race portion movable with respect to said retainer portion when either of said halves angulate with respect to each other, the improvement comprising:

an annular non-deflecting bearing seal adapted to be interfitted within said bearing seal space to act as a bearing and seal upon which said race rides with a low coefficient of friction, said bearing seal includes a non-layered graphite composition multi-faced band, and a reinforcing core of a different material than said graphite composition;

said retainer portion of said second half of said ball joint having two faces at angles one to the other and two faces of said multifaced band correspond to the angular relationship of said two faces of said retainer whereby said bearing seal is seated thereagainst in a fixed position; and said race portion of said first half of said ball joint includes a seal bearing face above said retainer portion of a different angle than either of said two faces of said retainer and said bearing includes another of its multifaces corresponding to the angle of said bearing face.

2. In a universal ball joint of claim 1 wherein said annular bearing seal reinforcing core is a mesh wire.

3. In a universal ball joint of claim 2 wherein said mesh wire is distributed throughout the interior of said graphite composition and is adapted to prevent compression of said bearing seal.

4. In a universal ball joint of claim 1 wherein one face of said retainer corresponds to the plane of said ducting and a second face continues from a bend outwardly of said ducting toward said race and at an angle relative to the plane of said one face and said two faces of said bearing seal corresponding with the faces of said retainer and seated thereagainst;

said seal bearing face of said race portion having a slight spherical radius and a third face extending between said first two faces and of a corresponding spherical radius to said spherical radius of said race for intimate contact therewith; and a fourth face on said bearing seal formed between said third face and said first face at a steeper angle than said third face of said bearing and seal.

5. A bearing seal adapted to be used in a two part universal ball joint interconnected by a bellows to reduce the coefficient of friction when said joint parts move with respect to each other and to effectively seal said two parts, which in turn is to be used in jet engine bleed high temperature air ducting of aircraft, said joint adapted to angulate and in turn angle said ducting as it extends through said aircraft, said bearing seal comprising:

an annular endless ring formed of a graphite composition having several bearing and sealing faces of differing angles one to the other around said ring;

a reinforcing annular core of material different than said graphite composition and impregnated therein and wherein said several bearing and sealing faces in cross-section include a first inner relatively flat face on one plane, having two ends, a second inner relatively flat face projecting from one of said ends at an angle of greater than 60° but less than 130° from said plane terminating in an end, and a slight spherical outer face interconnecting said end of said second inner face and said first inner face, wherein said spherical outer face is adapted to bear against one of said two parts of said joint, and said first and second inner relatively flat faces are adapted to bear against said other of said two parts of said joint.

* * * * *